US008296842B2

(12) United States Patent
Singh et al.

(10) Patent No.: US 8,296,842 B2
(45) Date of Patent: *Oct. 23, 2012

(54) DETECTING PUBLIC NETWORK ATTACKS USING SIGNATURES AND FAST CONTENT ANALYSIS

(75) Inventors: Sumeet Singh, San Francisco, CA (US); George Varghese, San Diego, CA (US); Cristi Estan, La Jolla, CA (US); Stefan Savage, Carlsbad, CA (US)

(73) Assignee: The Regents of the University of California, Oakland, CA (US)

( * ) Notice: Subject to any disclaimer, the term of this patent is extended or adjusted under 35 U.S.C. 154(b) by 842 days.

This patent is subject to a terminal disclaimer.

(21) Appl. No.: 11/547,944

(22) PCT Filed: Dec. 1, 2004

(86) PCT No.: PCT/US2004/040149
§ 371 (c)(1),
(2), (4) Date: Jul. 15, 2008

(87) PCT Pub. No.: WO2005/103899
PCT Pub. Date: Nov. 3, 2005

(65) Prior Publication Data
US 2008/0307524 A1    Dec. 11, 2008

(51) Int. Cl.
*H04L 29/06* (2006.01)
(52) U.S. Cl. .............. 726/22; 726/12; 726/13; 713/153
(58) Field of Classification Search .................. 713/153; 726/22, 23, 11, 12, 13
See application file for complete search history.

(56) References Cited

U.S. PATENT DOCUMENTS

| 6,477,651 B1 | 11/2002 | Teal |
| 6,578,147 B1 | 6/2003 | Shanklin et al. |
| 6,738,814 B1 | 5/2004 | Cox et al. |
| 6,829,635 B1 | 12/2004 | Townshend |

(Continued)

FOREIGN PATENT DOCUMENTS

WO    2005/103899    11/2005

OTHER PUBLICATIONS

Bloom, Burton, "Space/time trade-offs in hash coding with allowable errors," Communications of the ACM 13(7): 422-426, 1970.

(Continued)

*Primary Examiner* — David García Cervetti
(74) *Attorney, Agent, or Firm* — Perkins Coie LLP

(57) ABSTRACT

Network worms or viruses are a growing threat to the security of public and private networks and the individual computers that make up those networks. A content sifting method if provided that automatically generates a precise signature for a worm or virus that can then be used to significantly reduce the propagation of the worm elsewhere in the network or eradicate the worm altogether. The content sifting method is complemented by a value sampling method that increases the throughput of network traffic that can be monitored. Together, the methods track the number of times invariant strings appear in packets and the network address dispersion of those packets including variant strings. When an invariant string reaches a particular threshold of appearances and address dispersion, the string is reported as a signature for suspected worm.

69 Claims, 4 Drawing Sheets

U.S. PATENT DOCUMENTS

| | | | |
|---|---|---|---|
| 6,971,028 B1* | 11/2005 | Lyle et al. ............... | 726/25 |
| 6,988,208 B2 | 1/2006 | Hrabik et al. | |
| 7,080,408 B1 | 7/2006 | Pak et al. | |
| 7,089,592 B2 | 8/2006 | Adjaoute | |
| 7,535,909 B2 | 5/2009 | Singh et al. | |
| 7,564,970 B2* | 7/2009 | Damgaard et al. ........ | 380/28 |
| 7,596,806 B2* | 9/2009 | Chen ....................... | 726/11 |
| 7,596,807 B2* | 9/2009 | Ptacek et al. ............. | 726/11 |
| 7,748,040 B2* | 6/2010 | Adelstein et al. ......... | 726/25 |
| 7,904,454 B2* | 3/2011 | Raab ........................ | 707/733 |
| 7,904,956 B2* | 3/2011 | Golan et al. .............. | 726/22 |
| 7,926,113 B1* | 4/2011 | Gula et al. ................ | 726/25 |
| 2001/0037387 A1* | 11/2001 | Gilde et al. ............... | 709/225 |
| 2002/0107953 A1* | 8/2002 | Ontiveros et al. ......... | 709/224 |
| 2002/0138618 A1* | 9/2002 | Szabo ....................... | 709/225 |
| 2002/0144156 A1* | 10/2002 | Copeland, III ............ | 713/201 |
| 2003/0014662 A1* | 1/2003 | Gupta et al. ............... | 713/201 |
| 2003/0083847 A1* | 5/2003 | Schertz et al. ............. | 702/186 |
| 2003/0084318 A1* | 5/2003 | Schertz .................... | 713/200 |
| 2003/0084326 A1* | 5/2003 | Tarquini ................... | 713/200 |
| 2003/0084340 A1* | 5/2003 | Schertz et al. ............. | 713/201 |
| 2003/0101353 A1* | 5/2003 | Tarquini et al. ........... | 713/200 |
| 2003/0105976 A1* | 6/2003 | Copeland, III ............ | 713/201 |
| 2003/0115485 A1 | 6/2003 | Milliken | |
| 2003/0135749 A1* | 7/2003 | Gales et al. ............... | 713/200 |
| 2003/0188189 A1* | 10/2003 | Desai et al. ............... | 713/201 |
| 2003/0204632 A1* | 10/2003 | Willebeek-LeMair et al. ........................ | 709/249 |
| 2004/0028047 A1* | 2/2004 | Hou et al. ................. | 370/392 |
| 2004/0054925 A1* | 3/2004 | Etheridge et al. .......... | 713/201 |
| 2004/0064737 A1 | 4/2004 | Milliken et al. | |
| 2004/0073617 A1 | 4/2004 | Milliken et al. | |
| 2004/0073800 A1* | 4/2004 | Shah et al. ................ | 713/176 |
| 2004/0078384 A1* | 4/2004 | Keir et al. ................. | 707/102 |
| 2004/0083299 A1* | 4/2004 | Dietz et al. ............... | 709/230 |
| 2004/0088571 A1* | 5/2004 | Jerrim et al. .............. | 713/201 |
| 2004/0107361 A1* | 6/2004 | Redan et al. .............. | 713/201 |
| 2004/0174820 A1* | 9/2004 | Ricciulli ................... | 370/245 |
| 2004/0199630 A1* | 10/2004 | Sarkissian et al. ......... | 709/224 |
| 2004/0202190 A1* | 10/2004 | Ricciulli ................... | 370/410 |
| 2004/0250124 A1* | 12/2004 | Chesla et al. ............. | 713/201 |
| 2004/0250128 A1* | 12/2004 | Bush et al. ............... | 713/201 |
| 2005/0005017 A1* | 1/2005 | Ptacek et al. .............. | 709/229 |
| 2005/0010821 A1* | 1/2005 | Cooper et al. ............. | 713/201 |
| 2005/0018618 A1* | 1/2005 | Mualem et al. ........... | 370/252 |
| 2005/0022018 A1* | 1/2005 | Szor ........................ | 713/201 |
| 2005/0037733 A1* | 2/2005 | Coleman et al. ........... | 455/411 |
| 2005/0039047 A1* | 2/2005 | Raikar et al. .............. | 713/201 |
| 2005/0044406 A1* | 2/2005 | Stute ........................ | 713/201 |
| 2005/0097339 A1* | 5/2005 | Wiley et al. ............... | 713/188 |
| 2005/0172008 A1* | 8/2005 | Claudatos et al. .......... | 709/219 |
| 2005/0207420 A1* | 9/2005 | Shanklin et al. ........... | 370/392 |
| 2005/0210533 A1* | 9/2005 | Copeland et al. .......... | 726/23 |
| 2005/0229254 A1 | 10/2005 | Singh et al. | |
| 2005/0234915 A1* | 10/2005 | Ricciulli ................... | 707/10 |
| 2006/0026680 A1* | 2/2006 | Zakas ....................... | 726/22 |
| 2006/0098585 A1 | 5/2006 | Singh et al. | |
| 2006/0150249 A1 | 7/2006 | Gassen et al. | |
| 2006/0242703 A1 | 10/2006 | Abeni | |
| 2007/0094728 A1* | 4/2007 | Julisch et al. ............. | 726/23 |
| 2007/0112714 A1 | 5/2007 | Fairweather | |
| 2007/0192863 A1 | 8/2007 | Kapoor et al. | |

OTHER PUBLICATIONS

Estan et al., "Building a Better NetFlow," SIGCOMM 2004 Tech Report, Portland Oregon, Aug. 30-Sep. 3, 2004 (12 pages).

Fan et al., "Summary Cache: A Scalable wide-area Web cache sharing protocol," ACM SIGCOMM 98, Vancouver, British Columbia, Sep. 2-4, 1998 (12 pages).

Graham, Paul, "A Plan for Spam," http://www.paulgraham.com/spam.html, Aug. 2002, 12 pages, (accessed May 23, 2007).

Manber, Udi "Finding Similar Files in a Large File System", Proc. 1994 Winter Usenix Technical Conference, Jan. 1994, pp. 1-10.

Moore et al., "Inferring Internet Denial-of-Service Activity," Proceedings of the $10^{th}$ USENIX Security Symposium, Aug. 13-17, 2001, Washington, D.C, 15 pages.

Moore et al., "Internet Quarantine: Requirements for Containing Self-Propagating Code," The $22^{nd}$ Annual Joint Conference of the IEEE Computer and Communications Societies, San Francisco, CA, U.S.A. (Apr. 1-3, 2003).

Rabin, Michael O., "Fingerprinting by random polynomials," Center for Research in Computing Technology, Harvard University, Report TR-15-91, 1981.

Singh et al., "Automated Worm Fingerprinting," OSDI '04: $6^{th}$ Symposium on Operating Systems Design and Implementation, San Francisco, CA, U.S.A., USENIX Association, pp. 45-60 (Dec. 6-8, 2004).

Snort web site, www.snort.org, (accessed on May 23, 2007).

* cited by examiner

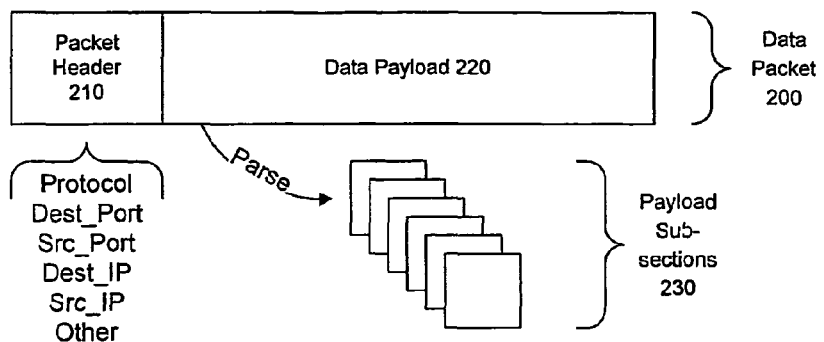
FIG. 3
FIG. 4
FIG. 5
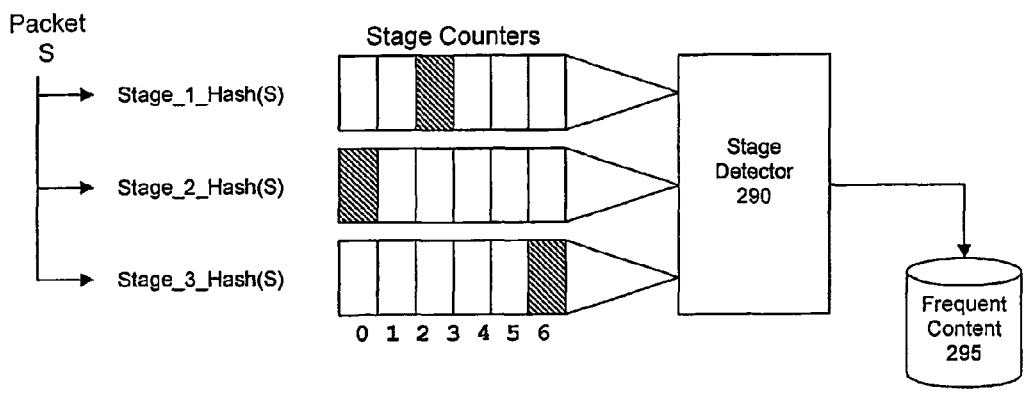
FIG. 6

DETECTING PUBLIC NETWORK ATTACKS USING SIGNATURES AND FAST CONTENT ANALYSIS

STATEMENT REGARDING FEDERALLY SPONSORED RESEARCH OR DEVELOPMENT

This invention was made with government support under contracts ANI-0137102 and 60NANB1D0118 awarded by the National Science Foundation and the National Institute of Standards and Technology, respectively. The government has certain rights in the invention.

CROSS-REFERENCE TO RELATED APPLICATIONS

This application is a national stage application of and claims the benefit of PCT/US2004/040149 filed on Dec. 1, 2004, now WO 2005/103899, which claims the benefit of priority from U.S. patent application Ser. No. 10/822,226, filed on Apr. 8, 2004. Both applications are incorporated herein by reference in their entirety.

BACKGROUND

1. Field of the Invention

The present disclosure generally relates to the field of network security and more particularly relates to the prevention of self-propagating worms and viruses through data traffic analysis.

2. Related Art

Many computers are connected to publicly-accessible networks such as the Internet. This connection has made it possible to launch large-scale attacks of various kinds against computers connected to the Internet. A large-scale attack is an attack that involves several sources and destinations, and which often (but not necessarily) involves a large traffic footprint. Examples of such large-scale attacks may include: (a) viruses, in which a specified program is caused to run on the computer, which then attempts to spread itself to other computers known to the host computer (e.g., those listed in the address book); and (b) denial of service attacks (DoS), in which a group of computers is exposed to so many requests that it effectively loses the ability to respond to legitimate requests. Many viruses and worms indirectly cause DoS attacks as well for networks by sending a huge amount of traffic while replicating. Distributed denial of service (DDOS) occurs when an attacker uses a group of machines (sometimes known as zombies) to launch a DoS attack.

Another form of large-scale attack is called backdoor or vulnerability scanning. In such an attack an intruder scans for backdoors at machines or routers. A backdoor is a method by which a previously attacked machine can then be enlisted by future attackers to be part of future attacks.

Spam is unsolicited network messages often sent for commercial purposes. Large-scale spam is often simply the same as (or small variants of) the spam sent to multiple recipients. Note that this definition of spam includes both email as well as newer spam variants such as Spam Sent Over Instant Messenger.

A specific form of attack is an exploit, which is a technique for attacking a computer, which then causes the intruder to take control of the target computer, and run the intruder's code on the attack machine. A worm is a large-scale attack formed by an exploit along with propagation code. Worms can be highly efficacious, since they can allow the number of infected computers to increase geometrically. The worm can do some specific damage, or alternatively can simply take up network bandwidth and computation, or can harvest e-mail addresses or take any other desired action.

Many current worms propagate via random probing. In the context of the Internet, each of the number of different computers has an IP address, which is a 32-bit address. The probing can simply randomly probe different combinations of 32-bit addresses, looking for machines that are susceptible to the particular worm. Once the machine is infected, that machine starts running the worm code, and again begins probing the Internet. This geometrically progresses.

A very common exploit is a so-called buffer overflow. In computers, different areas of memory are used to store various pieces of information. One area in memory may be associated with storing information received from the network: such areas are often called buffers. However, an adjoining area in the memory may be associated with an entirely different function. For example, a document name used for accessing Internet content (e.g., a URL) may be stored into a URL buffer. However, this URL buffer may be directly adjacent to protected memory used for program access. In a buffer overflow exploit, the attacker sends a URL that is longer than the longest possible URL that can be stored in the receiver buffer and so overflows the URL buffer which allows the attacker to store the latter portion of its false URL into protected memory. By carefully crafting an extra long URL (or other message field), the attacker can overwrite the return address, and cause execution of specified code by pointing the return address to the newly installed code. This causes the computer to transfer control to what is now the attacker code, which executes the attacker code.

The above has described one specific exploit (and hence worm) exploiting the buffer overflow. A security patch that is intended for that exact exploit can counteract any worm of this type. However, the operating system code is so complicated that literally every time one security hole is plugged, another is noticed. Further, it often takes days for a patch to be sent by the vendor; worse, because many patches are unreliable and end users may be careless in not applying patches, it may be days, if not months, before a patch is applied. This allows a large window of vulnerability during which a large number of machines are susceptible to the corresponding exploit. Many worms have exploited this window of vulnerability.

A signature is a string of bits in a packet that characterize a specific attack. For example, an attempt to execute the perl program at an attacked machine is often signaled by the string "perl.exe" in a message/packet sent by the attacker. Thus a signature-based blocker could remove such traffic by looking for the string "perl.exe" anywhere in the content of a message. The signature could, in general, include header patterns as well as exact bit strings, as well as bit patterns (often called regular expressions) which allow more general matches than exact matches.

While the exact definition of the different terms above may be a matter of debate, the basic premise of these, and other attacks, is the sending of undesired information to a publicly accessible, computer, connected to a publicly accessible network, such as the internet.

Different ways are known to handle such attacks. One such technique involves using the signature, and looking for that signature in Internet traffic to block anything that matches that signature. A limitation of this technique has come from the way that such signatures are found. The signature is often not known until the first attacks are underway, at which point it is often too late to effectively stop the initial (sometimes called zero-day) attacks.

An Intrusion Detection System (IDS) may analyze network traffic patterns to attempt to detect attacks. Typically, IDS systems focus on known attack signatures. Such intrusion detection systems, for example, may be very effective against so-called script kiddies who download known scripts and attempt to use them over again, at some later time.

Existing solutions to attacks each have their own limitations. Hand patching is when security patches from the operating system vendor are manually installed. This is often too slow (takes days to be distributed). It also requires large amounts of resources, e.g., the person who must install the patches.

A firewall may be positioned at the entrance to a network, and reviews the packets coming from the public portion of the network. Some firewalls only look at the packet headers; for example, a firewall can route e-mail that is directed to port 25 to a corporate e-mail gateway. The firewalls may be useful, but are less helpful against disguised packets, e.g., those disguised by being sent to other well-known services.

Intrusion detection and prevention systems, and signature based intrusion systems look for an intrusion in the network. These are often too slow (because of the time required for humans to generate a signature) to be of use in a rapidly spreading, new attack.

Other systems can look for other suspicious behavior, but may not have sufficient context to realize that certain behavior accompanying a new attack is actually suspicious. For example, a common technique is to look for scanning behavior but this is ineffective against worms and viruses that do not scan. This leads to so-called false negatives where more sophisticated attacks (increasingly common) are missed.

Scanning makes use of the realization that an enterprise network may be assigned a range of IP addresses, and may only use a relatively small portion of this range for the workstations and routers in the network. Any outside attempts to connect to stations within the unused range may be assumed to be suspicious. When multiple attempts are made to access stations within this address space, they may increase the level of suspicion and make it more likely that a scan is taking place. This technique has been classically used as part of the so-called network telescope approach.

SUMMARY

A content sifting system and method is provided that automatically generates a signature for a worm or virus. The signature can then be used to significantly reduce the propagation of the worm elsewhere in the network or eradicate the worm altogether. A complementary value sampling method and system is also provided that increases the throughput of network traffic that can be monitored. Together, the methods and systems identify invariant strings that appear in or across packets and track the number of times those invariant strings appear along with the network address dispersion of those packets that include the invariant strings. When an invariant string reaches a particular threshold of appearances and address dispersion, the string is reported as a signature for a suspected attack.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3 is a block diagram illustrating an example packet according to an embodiment of the present invention;

FIG. 4 is a block diagram illustrating an example content prevalence table according to an embodiment of the invention;

FIG. 5 is a block diagram illustrating an example address dispersion table according to an embodiment of the invention;

FIG. 6 is a functional block diagram illustrating an example hashing technique according to an embodiment of the invention.

DETAILED DESCRIPTION

The present description is related to U.S. patent application Ser. No. 10/822,226 entitled DETECTING PUBLIC NETWORK ATTACKS USING SIGNATURES AND FAST CONTENT ANALYSIS, filed on Apr. 8, 2004, which is incorporated herein by reference in its entirety.

Certain embodiments as disclosed herein provide for systems and methods for identifying an invariant string or repeated content to serve as a signature for a network attack such as a worm or virus. For example, one method and system as disclosed herein allows for a firewall or other sensor unit to examine packets and optimally filter those packets so that invariant strings within or across packets are identified and tracked. When the frequency of occurrence of a particular invariant string reaches a predetermined threshold and the number of unique source addresses and unique destination addresses also reach a predetermined threshold, the particular invariant string is reported as a signature for a suspected worm. For ease of description, the example embodiments described below refer to worms and viruses. However, the described systems and methods also apply to other network attacks and the invention is not limited to worms and viruses.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
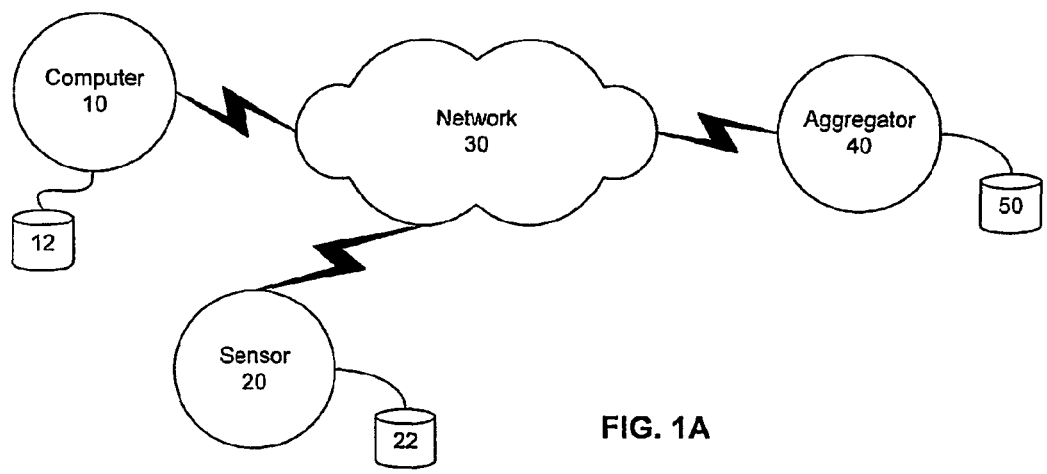
FIG. 1A is a network diagram illustrating an example network according to an embodiment of the invention.

FIG. 1A is a network diagram illustrating an example network 30 according to an embodiment of the invention. In the illustrated embodiment, a computer 10, sensor unit 20, and an aggregator unit 40 are part of and are communicatively coupled via the network 30. The network 30 may be a local network, a wide area network, a private network, a public network, a wired network or wireless network, or any combination of the above, such as the ubiquitous Internet.

Internet messages are sent in packets including headers that identify the destination and/or function of the message. An IP header identifies both source and destination for the payload. A TCP header may also identify destination and source port number. The port number identifies the service which is requested from the TCP destination in one direction, and from the source in the reverse direction. For example, port 25 may be the port number used commonly for e-mail; port number 80 is often used for FTP and the like. The port number thus identifies the specific resources which are requested.

An intrusion is an attempt by an intruder to investigate or use resources within the network 30 based on messages over the network. A number of different systems are in place to detect and thwart such attacks. It has been recognized that commonalities between the different kinds of large-scale attacks, each of which attack a different security hole, but each of which have something in common.

Typical recent attacks have large numbers of attackers. Typical recent attacks often increase geometrically, but in any case the number of infected machines increases. Attacks may also be polymorphic, that is they change their content during each infection in order to thwart signature based methods.

The present systems and methods describe detecting patterns in data and using those patterns to determine the properties of a new attack. Effectively, this can detect an attack in the abstract, without actually knowing anything about the details of the attack. The detection of attack can be used to generate a signature, allowing automatic detection of the attack. Another aspect describes certain current properties which are detected, to detect the attack.

A technique is disclosed which identifies characteristics of an abstract attack. This technique includes looking for properties in network data which make it likely that an attack of a new or previous type is underway.

The present disclosure describes a number of different properties being viewed, however it should be understood that these properties could be viewed in any order, and other properties could alternatively be viewed, and that the present disclosure only describes a number of embodiments of different ways of finding an attack under way.

An aspect of the disclosed technique involves looking through large amounts of data that is received by the sensor 20 as shown in FIG. 1A. One embodiment discloses a truly brute force method of looking through this data; and this brute force method could be usable if large amounts of resources such as memory and the like are available. Another embodiment describes scalable data reduction techniques, in which patterns in the data are determined with reduced resources, e.g., smaller configurations of memory and processing.

The computer 10 may be any of a variety of types of computing devices such as a general purpose computer device. The computer 10 may be a user device or a server machine or any other type of computer device that performs a multi-purpose or dedicated service.

The sensor 20 is configured with a data storage area 22. The sensor 20 may be any of a variety of types of computing devices such as a general purpose computer device. The sensor 20 may be a stand alone unit or it may be integral with the computer 10 or the aggregator 40. There can be a single sensor 20 as shown or in other embodiments there can be a plurality of sensors that alone or collectively carry out the functions or a portion of the functions of the invention. The sensor 20 receives packets from the network 30 and analyzes the packets for indications of an attack. If a possible attack is detected, the sensor 20 can notify the aggregator 40, which can then take appropriate action.

Similarly, the aggregator 40 is configured with a data storage area 42 and may be any of a variety of types of computing devices such as the general purpose computer device. Additionally, there may be one or more aggregators 40 that alone or collectively carry out the functions or a portion of the functions of the invention.

Figure 1B:
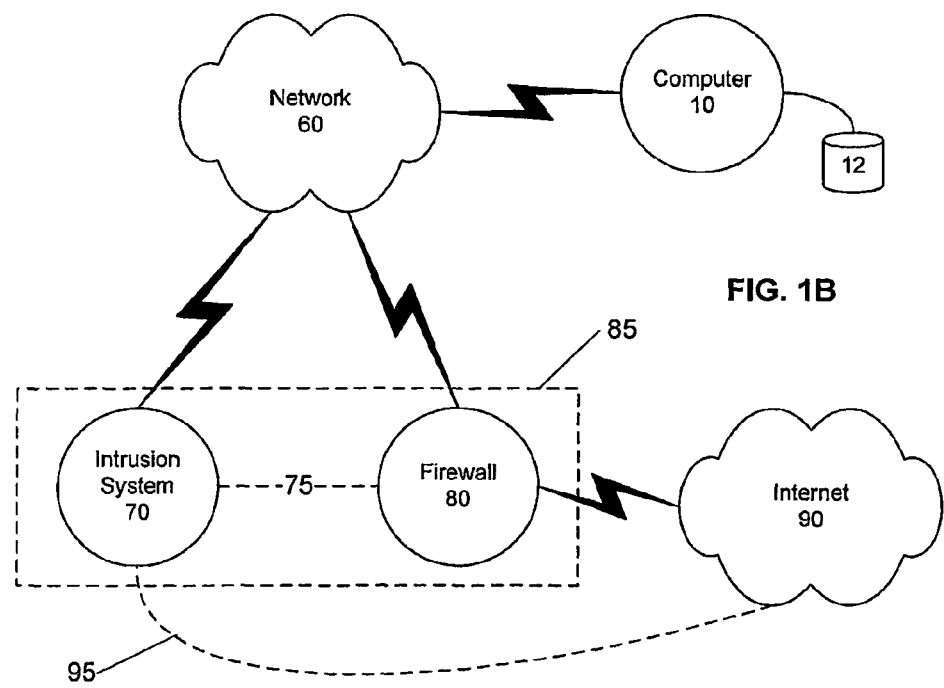
FIG. 1B is a network diagram illustrating an example network according to an embodiment of the invention.

FIG. 1B is a network diagram illustrating an alternative example network 60 according to an embodiment of the invention. In the illustrated embodiment, the computer 10 is communicatively coupled with an intrusion system 70 and a firewall 80 via the network 60. The computer 10 is also in communication with the Internet 90 via the firewall 80 or optionally through the intrusion system 70.

The intrusion system 70 is configured with a data storage area (not shown) and may be in communication with the firewall 80 via the network 60 or optionally through a direct communication link 75. The intrusion system 70 is also in communication with the Internet 90 through the firewall 80 or optionally directly through communication link 95. The intrusion system 70 preferably carries out the same function as the previously described sensor 20 and may be a stand alone unit or integrated with another device. In one embodiment, the intrusion system 70 can perform the combined functions of the previously described sensor 20 and the aggregator 40.

The intrusion system 70 may be any of a variety of types of computing devices such as a general purpose computer device. There may be a single intrusion system 70 as shown or there may be more than one that alone or collectively carry out the functions or a portion of the functions of the invention. In an embodiment, the intrusion system 70 may be integrated with the firewall 80 into a combined device 85. In such a case, the communication link 75 may take the form of shared memory or inter-process communication, as will be understood by one having skill in the art.

The firewall 80 is also configured with a data storage area (not shown) and may be any of a variety of types of computing devices such as a general purpose computer. Additionally, there may be one or more firewalls that alone or collectively carry out the functions or a portion of the functions of the invention described herein.

Figure 2A:
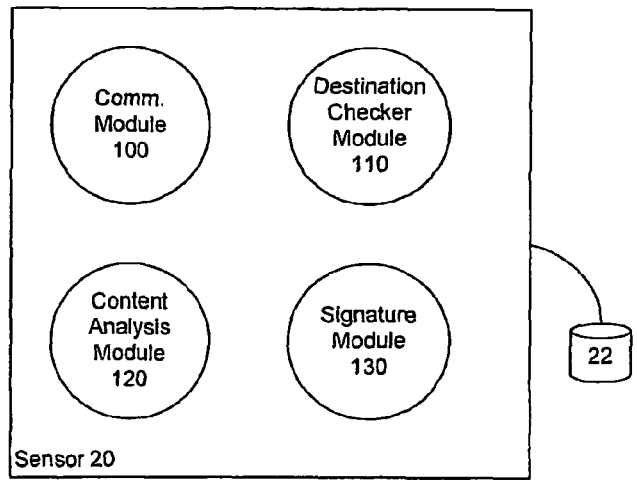
FIGS. 2A-C are block diagrams illustrating an example sensor unit according to an embodiment of the invention.

FIG. 2A is a functional block diagram illustrating an example sensor 20 according to an embodiment of the invention. In the illustrated embodiment, the sensor 20 is configured with a data storage area 22 and includes a communication module 100, a destination checker module 110, a content analysis module 120, and a signature module 130. The data storage area 22 may include both internal and external data storage and include volatile and non-volatile memory devices. The configuration of computing devices with various types of memory is well known in the art and will therefore not be discussed in detail herein.

The communication module 100 handles network communications for the sensor 20 and receives and processes packets appearing on the network interface (not shown). The communication module 100 may also handle communications with other sensors and one or more aggregators or computers. In one embodiment, when packets are received by the communication module 100, they are provided to the destination checker module 110, content analysis module 120, and signature module 130 for further processing in parallel.

The destination checker module 110 examines packets based on a special assumption that there is known vulnerability in a destination machine. This makes the problem of detection much easier and faster. The destination checker module 110 analyzes the packets for known vulnerabilities such as buffer overflows at a specific destination port. For example, a list of destinations that are susceptible to known vulnerabilities is first consulted to check whether the destination of the current packet being analyzed is on the list. Such a list can be built by a scan of the network prior to the arrival of any packets containing an attack and/or can be maintained as part of routine network maintenance.) If the specific destination is susceptible to a known vulnerability, then the packet intended for that destination is parsed to determine if the packet data conforms to the vulnerability. For example, in a buffer overflow vulnerability for a URL, the URL field is found and its length is checked to see if the field is over a pre-specified limit. If the packet is determined to conform to a known vulnerability, delivery of that packet can be stopped. Alternatively, the contents of the packet that exploit the vulnerability (for example, the contents of the field that would cause a buffer overflow) are forwarded as an anomalous signature, together with the destination and source of the packet. The contents may be forwarded, for example, to an aggregator 40 as previously described with respect to FIG. 1A so that a possible attack may be identified and stopped.

Content analysis module 120 examines the content of a packet to determine if it meets criteria that are not necessarily based on a known vulnerability. For example, the content analysis module 120 may examine packets in the aggregate to determine if they contain repetitive content. It has been found that large attacks against network resources typically include content that repeats an unusual number of times. For example, the content could be TCP or IP control messages for denial of service attacks. By contrast, worms and viruses have content that contains the code that forms the basis of the attack, and hence that code is often repeated as the attack propagates from computer to computer. Spam has repeated content that contains the information the spammer wishes to send to a large number of recipients.

Advantageously, only the frequently repeated content (signatures) are likely to be problems. For example, a signature that repeats just once could not represent a large-scale attack. At most, it represents an attack against a single machine. Therefore, the frequent signatures may be further analyzed by the content analysis module 120 to determine if it is truly a threat, or is merely part of a more benign message.

The signature module 130 analyzes packet data to determine what signatures, if any, are included in the data payload. The signature module 130 may examine individual packets to find signatures or it may examine the data within a single packet and across packets to find signatures that extend across packet boundaries. The signature module 130 may work in concert with the other modules in the sensor 20 to provide them with information about signatures in packets.

Figure 2B:
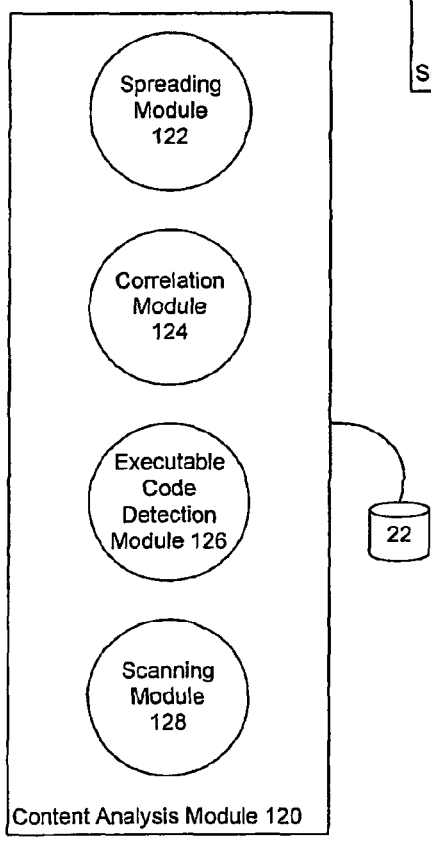

FIG. 2B is a functional block diagram illustrating an example content analysis module 120 according to an embodiment of the invention. In the illustrated embodiment, the content analysis module 120 is configured with a data storage area 22 and includes a spreading module 122, a correlation module 124, an executable code detection module 126, and a scanning module 128.

The spreading module 122 is configured to determine whether a large (where "large" is defined by thresholds that can be set to any desired level) number of attackers or attacked machines are involved in sending/receiving the same content. The content is "common," in the sense that the same frequent signatures are being sent. During a large-scale attack, the number of sources or destinations associated with the content may grow geometrically. This is in particular true for worms and viruses. For spam, the number of destinations to which the spam content is sent may be relatively large; at least for large-scale spam. For denial of service attacks, the number of sources may be relatively large. Therefore, spreading content may be an additional factor representing an ongoing attack.

When a frequent signature is detected, the spreading module 122 investigates whether the content is exhibits characteristics of spreading. This can be done, for example, by looking for and counting the number of sources and destinations associated with the content.

In a brute force example, a table of all unique sources and all unique destinations is maintained. Each piece of content is investigated to determine its source and its destination. For each string S, a table of sources and a table of destinations are maintained. Each unique source or destination may increment respective counters. These counters maintain a count of the number of unique sources and unique destinations.

When the same string S comes from the same source, the counter is not incremented. When that same string does come from a new source, the new source is added as an additional source and the unique source counter is incremented. The destinations are counted in an analogous way. The source table is used to prevent over-counting the number of sources. That is, if Sally continually sends the message "hi Joe" Sally does not get counted twice.

The frequent and spreading signatures found by the spreading module 122 can also be subjected to additional checks such as a check for executable code, spam, backdoors, scanning, and correlation. Each of these checks, and/or additional checks, can be carried out by modules, either software based, hardware based, or any combination thereof.

The correlation module 124 examines the source and destination of multiple packets to determine if an interval pattern is present. For example, a piece of content may be sent to a set of destinations in a first measured interval. In a later second measured interval, the same piece of content is sent by some fraction of these destinations acting as sources of the content. Such correlation can imply causality wherein infections sent to destinations in the first interval are followed by these stations acting as infecting agents in the later interval.

In one embodiment, a correlation test can be used to scalably detect the correlation between content sent to stations in one interval, and content sent by these sources in the next interval. The correlation test is a likely sign of an infection. Meeting the correlation test adds to the guilt score assigned to a piece of content.

For example, a bitmap for source addresses and a bitmap for destination addresses are initialized to "0" whenever a new signature is detected and added to what may be referred to as a frequent content table. A similar initialization occurs at the end of every time interval to reset the frequency. The concepts used are very similar to those described herein for detecting spreading content when similar bitmap structures can be used.

Thus, when a new signature is detected, the source IP address is hashed into the source bitmap and the destination IP address is analogously hashed into the destination bitmap. The bit positions set in the source bitmap for this interval are then compared with the bit positions set in the destination bitmap for the previous interval. If a large number of set bits are in common, it indicates that a large number of the destinations that received the content in the last interval are sending the same content in this interval. Accordingly, the correlation module 124 would identify that content as passing the correlation test.

Another example correlation test is a spam test conventionally known as the Bayesian spam test. The Bayesian test may heuristically analyze the content to determine if the suspected content is in fact spam according to the Bayesian rules.

The executable code detection module 126 detects the presence of executable code segments. The presence of executable code segments may also be an additional (but not necessary) sign of an attack. Worms and certain other attacks are often characterized by the presence of code (for example, code that can directly execute on Windows machines) in the attack packets they send. Therefore, in analyzing content to determine an infestation, the repeatable content is tested against parameters that determine executable code segments. It is unlikely that reasonably large segments of contiguous packet data will accidentally look like executable code; this observation is the basis of special techniques for determining the presence of code. In one aspect, a check is made for Intel 8086 and Unicode executable code formats.

In one embodiment, the executable code detection module 126 is configured to test each suspicious data segment that is identified. For example, a data segment starting at the beginning of a packet, at an offset, or spanning across packets can be tested for executable code. When code is detected to be over a specified length, the executable code detection module 126 reports a positive code test, for example to the sensor or intrusion system.

A variety of different code tests can be employed by the executable code detection module 126. For example, a particular code test can simply be a disassembler nm on the packet at each of the plurality of offsets. Most worms and the like use 8086 code segments. Therefore, an 8086 disassembler can be used for this purpose.

Alternatively, a technique of looking for opcodes and associated information can be used as a code test. The opcodes may be quite dense, leaving only a few codes that are clearly not 8086 codes. Each opcode may have associated special information following the code itself. While a small amount of data may look like code, because of the denseness of the opcodes, it is quite unlikely that large strings of random data look like codes. For example, if 90% of the opcodes are assigned, a random byte of data has a 90% chance of being mistaken for a valid opcode; however, this is unlikely to keep happening when measured over 40 bytes of data that each of the appropriate bytes looks like a valid opcode.

This test, therefore, maintains a small table of all opcodes, and for each valid opcode the test uses the length of the instruction to test whether the bits are valid. In one example, the code test may start at offset O, perform a length test, and then repeat until a length greater than N for opcodes tests of length N. Then each bit at offset O along with its length in the opcode table, is looked up. If the opcode table indicates that the byte is invalid, the code test would fail. If the opcode table entry is valid, the length test is incremented by the opcode table entry length and the code test would continue. The system thus checks for code at offset O by consulting the table looking for a first opcode at O. If the opcode is invalid, then the test fails, and the pointer moves to test the next offset. However, if the opcode is valid, then the test skips the number of bytes indicated by the instruction length, to find the next opcode, and the test repeats. If the test has not failed after reaching N bytes from the offset O, then the code test has succeeded.

This test can be carried out on each string, using 8086 and unicode, since most of the attacks have been written in these formats. It should be understood, however, that this may be extended to other code sets where desirable to do so.

As previously described, the code test can be combined with the frequent content test or other tests to confirm whether a piece of frequent content contains at least one fragment of code. In an alternative embodiment, the code detection test can be used as a threshold test prior to the other tests such as the frequent content test. In such an embodiment, only content that has a code segment of size N or more would be considered for frequent content testing.

The scanning module 128 is configured to determine whether IP addresses or ports are being probed for potential vulnerability. For example, it may be necessary for an attacker to communicate with vulnerable sources in order to launch an attack. Scanning may be used by the attacker or worm/virus to find valid IP addresses to probe for vulnerable services. Probing of unused addresses and/or ports can be used by the attacker to make this determination. However it is possible that future attacks may also modify their propagation strategies to use pre-generated addresses instead of probing. Accordingly, one embodiment uses scanning only as an additional sign of an attack which is not necessary to output an anomalous signature.

In one embodiment, a scanning test is employed that, unlike conventional scanning systems, uses both the content and the source as keys for the test. Conventional systems tested only the source address. In the scanning test, tests are made for content that is being sent to unused addresses (of sources that disburse such content and send to unused addresses) and not solely sources. A guilt score is assigned to pieces of "bad" content, though as a side-effect, the individual stations disbursing the bad content may also be tagged. Notice also that the exploit in a TCP-based worm will not be sent to these addresses because a connection cannot be initiated without an answer from the victim.

In one embodiment, the scanning module 128 looks for a range of probes to an unused space. For example, a source address may make several attempts to communicate with an inactive address or port by mistake. A hundred attempts to a single unused address or port is less suspicious than a single attempt to each of a hundred unused addresses/ports. Thus rather than counting just the number of attempts to unused addresses, the scanning module 128 may also make an estimate of the range of unused addresses that have been probed.

To implement these augmentations scalably, a representation of the set of the unused addresses/ports of an enterprise or campus network is maintained by the scanning module 128. For scalability, unused addresses can be done compactly using a bitmap (for example, for a Class B network, 64K bits suffices) or a Bloom Filter (described in Fan, et al., Summary Cache: A Scalable Wide-Area Web Cache Sharing Protocol, SIGCOMM 98, 1998). The list can be dynamically validated. Initial guesses about which address spaces are being used can be supplied by a manager. This can easily be dynamically corrected. For example, whenever an address S thought to be unassigned sends a packet from the inside, that address should be updated to be an assigned address. Note that in the special case of a contiguous address space, a simple network mask suffices.

A scalable list of unused ports can be kept by keeping an array with one counter for each port, where each array entry is a counter. The counter is incremented for every TCP SYN sent or each RESET sent, and decremented for every TCP FIN or FIN-ACK sent. Thus, if a TCP-based attack occurs to a port and many of the machines it contacts are not using this port, TCP FINs will not be sent back by these machines, or they will send TCP resets. Thus, the counter for that port will increase. Some care must be taken in implementing this technique to handle spoofing and asymmetrical routing, but even the simplest instance of this method will work well for most organizations.

A "blacklist" of sources that have sent packets to the unused addresses or ports in the last k measurement periods. This can be done compactly via a Bloom Filter or a bitmap. A hashed bit map can also be maintained, (similar to counting sources above) of the inactive destinations probed, and the ports for which scanning activity is indicated.

For each piece of frequent content, the mechanism keeps track of the range of sources in the blacklisted list associated with the content. Once again, this can be done scalably using a hashed bitmap as described herein. In one embodiment, testing for content of scanning can be implemented by hashing the source address of a suspicious signature S into a position within the bit map. When the number of bits set within that suspicion bit map exceeds a threshold, then the scanning is reported as true.

Note that while worms may evince themselves by the presence of reasonably large code fragments, other attacks such as Distributed Denial of Service may be based on other characteristics such as large amounts of repetition, large number of sources, and the reception of an unusually large number of TCP reset messages. The content analysis module 120 may identify spam, for example, as being characterized by repetitive presence of keywords identified based on heuristic criteria. These additional checks for spreading, correlation, executable code, scanning, and spam can be optional such that one or more or none of these tests may be used.

Figure 2C:
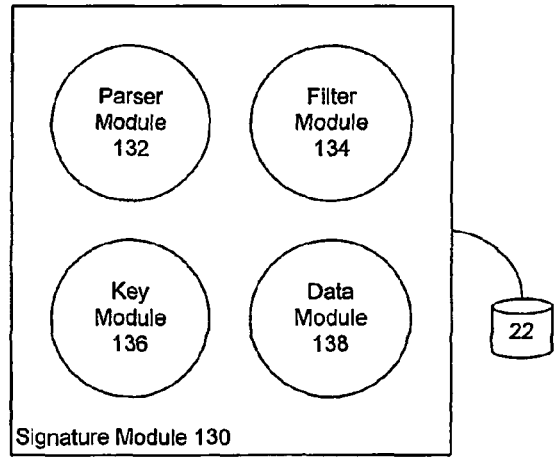

FIG. 2C is a functional block diagram illustrating an example signature module 130 according to an embodiment of the invention. In the illustrated embodiment, the signature module 130 is configured with a data storage area 22 and includes a parser module 132, a filter module 134, a key module 136, and a data module 138. The signature module 130 is configured to examine packets for signatures that appear within a single packet or are spread across packets. The signature module 130 preferably works in connection with the other modules of the sensor 20 to detect a possible attack.

In an embodiment, the signature module 130 can perform a brute force examination of each packet that is received. It should be understood, however, that the brute force method of analyzing content could require incredible amounts of data storage. For example, commonly used intrusion systems/sensors that operate at 1 Gigabit per second, easily produce terabytes of packet content over a period of a few hours. Accordingly, a general data reduction technique may be used. It should be understood, however, that other detection techniques may be used without a general data reduction technique. Thus, in an embodiment, a data reduction technique can advantageously be used as part of those detection techniques that generate large amounts of data, such as signatures and source/destination addresses and ports.

In one aspect, a signature for a possible attack (also referred to as an "anomalous signature") may be established when any frequent content is found that also meets an additional test such as spreading, correlation, executable code segments, or any other test. According to another aspect, the signatures may be scored based on the amount of indicia they include. In any case, this information is used to form anomalous signatures that may then be used to block operations or may be sent to a bank of signature blockers and managers such as the aggregator 40 previously described with respect to FIG. 1A.

In addition to the signature, if a packet signature is deemed to be anomalous according to the tests above, the destination and source of the packet may be stored. This can be useful, for example, to track which machines in a network have been attacked, and which ones have been infected.

An intrusion detection system (or sensor) device may also (in addition to passing the signature, source, destination, or other information) take control actions by itself. Standard control actions that are well known in the state of the art include connection termination (where the TCP connection containing the suspicious signature is terminated), connection rate limiting (where the TCP connection is not terminated but slowed down to reduce the speed of the attack), and packet dropping (where any packet containing the suspicious content is dropped with a certain probability). Note that when an attack is based on a known vulnerability, packet dropping with probability 1 can potentially completely prevent an attack from coming into a network or organization.

The signature module 130 is configured to identify a signature S from within any subset of the packet data payload and/or header. In general, a signature can be any subset of the data payload. A signature can also be formed from any portion of the data payload added to or appended to information from the packet header, for example, the TCP destination (or source) port. This type of signature recognizes that many attacks target specific destination (or in some limited cases, source) ports. An offset signature is based on the recognition that modern large-scale attacks may become polymorphic—that is, may modify the content on individual attack attempts. This is done to make each attack attempt look like a different piece of content. Complete content change is unlikely, however. Some viruses add small changes, while others encrypt the virus but add a decryption routine to the virus. Each contains some common piece of content; in the encryption example, the decryption routine would be the common piece of content.

The attack content may lie buried within the packet content and may be repeated, but other packet headers may change from attack to attack. Thus, according to another embodiment, the signature is formed by any continuous portion in the data payload, appended to the TCP destination port. Therefore, the signature module 130 investigates for content repetition strings anywhere within the TCP payload. For example, the text "hi Joe" may occur within packet 1 at offset 100 in a first message, and the same text "hi Joe" may occur in packet 2 at offset 200. This signature module 130 allows for counting these as two occurrences of the same string despite the different offsets in each instance.

The evaluation of this occurrence is carried out by evaluating all possible substrings in the packet of any certain length. A value of a substring length can be chosen, for example, 40 bytes. Then, a data payload each piece of data coming in may be windowed, to first look for bytes 1 through 40, then look for bytes 2 through 41, then look for bytes 3 through 42. All possible offsets are evaluated.

Determining the length of substrings that are evaluated is a trade-off depending on the desired amount of processing. Longer substrings will typically have fewer false positives, since it is unlikely that randomly selected substrings can create repetitions of a larger size. On the other hand, shorter substrings may make it more difficult for an intruder to evade attacks.

Certain attacks may chop the attack into portions which are separated by random filler. However, these separated portions will still be found as several invariant content substrings within the same packet. In such an attack, a multi-signature may be identified by the signature module 130. A multi-signature may comprise one or more continuous portions of payload combined with information from the packet header such as the destination port.

Other attacks may break the attack into portions that are separated across two or more packets. In such an attack, when the packets are received and placed in order, the data payloads can be examined such that predetermined sized strings that span adjacent packets are analyzed for invariant content substrings that cross packet boundaries. Thus, an inter-packet signature may be identified that comprises a portion of payload from a first packet with a portion of payload from a second packet. Furthermore, the two source packets for the inter-packet signature are preferably adjacent when reordered.

The parser module 132 receives packets and parses the header and data payload from the packet. The parser module 1320 additionally extracts information from the packet header such as the protocol, the source IP address, the destination IP address, the source IP (or UDP) port, and the destination IP (or UDP) port just to name a few. The parser module 132 also breaks down the data payload into predetermined sized strings for further processing by other components of the sensor. As described, the predetermined sized strings may extend across packet boundaries such that a single predetermined sized string may have a portion of its content from a first packet and a portion of its content from a second, adjacent packet.

The filter module 134 may be implemented in hardware as a series of parallel processors or application specific integrated circuits. Alternatively the filter module 134 may be implemented in software that includes one or more routines. Advantageously, the software may be threaded so that the filtering process implemented in software is also a parallel process to the extent allowed by the associated hardware on which the software is running. The function of the filter 134 is to optimally reduce the number of predetermined sized strings that are processed while maintaining high efficacy for virus detection, as described later in detail with respect to FIG. 6.

The key manager 136 identifies the invariant strings from the data payload that may qualify as a signature, for example, due to their repetitive nature, inclusion of code segments, matching a predetermined string, etc. The key manager 136 may combine information from the packet header with an identified string of content from the packet data payload to create a key. Each key is possibly a worm or virus signature. Alternatively, the key manager 136 may create a key from the string of content alone or from the string of content in combination with other information selected from the packet header such as the destination IP address or the destination port. In an embodiment, the key manager 136 performs data reduction on the key to minimize the size of the key.

In one embodiment, a data reduction technique called hashing may be employed. Hashing is a set of techniques to convert a long string or number into a smaller number. A simple hashing technique is often to simply remove all but the last three digits of a large number. Since the last three digits of the number are effectively random, it is an easy way to characterize something that is referred by a long number. For example, U.S. Pat. No. 6,398,311 can be described simply the 311 patent. However, much more complex and sophisticated forms of hashing are known.

In one example, assume the number 158711, and that this number must be assigned to one of 10 different hashed "bins" by hashing the number to one of 10 bins. One hashing technique simply adds the digits 1+5+8+7+1+1 equals 23. The number 23 is still bigger than the desired number of 10. Therefore, another reduction technique is carried out by dividing the final number by 10, and taking the remainder ("modulo 10"). The remainder of 23 divided by 10 is 3. Therefore, in 158711 is assigned to bin 3. In this technique, the specific hash function is: (1) add all the digits; and (2) take the remainder when divided by 10.

The same hash function can be used to convert any string into a number between 0 and 9. Different numbers can be used to find different hashes.

The hash function is repeatable, that is, any time the hash function receives the number 158711, it will always hash to bin 3. However, other numbers will also hash to bin 3. Any undesired string in the same bin as a desired string is called a hash collision.

Many other hash functions are known, and can be used. These include Cyclic Redundancy Checks (CRCs) commonly used for detecting errors in packet data in networks, a hash function based on computing multiples of the data after division by a pre-specified modulus, the so-called Carter-Wegman universal hash functions (the simplest instantiation of which is to multiply the bit string by a suitably chosen matrix of bits), hash functions such as Rabin hash functions based on polynomial evaluation, and one-way hash functions such as MD-5 used in security. This list is not exhaustive and it will be understood that other hash functions and other data reduction techniques can be used.

A data reduction technique that is advantageous to use with the data payload subsections 230 described with respect to FIG. 3 allows adding a part of the hash and removing a part when moving between two adjacent subsections. One aspect of this embodiment, therefore, may use an incremental hash function. Incremental hash functions make it easy to compute the hash of the next substring based on the hash of the previous substring. One classic incremental hash function is a Rabin hash function (used previously by Manber in spotting similarities in files instead of other non-incremental hashes (e.g, SHA, MD5, CRC32)).

A large data payload may contain thousands of bytes. Accordingly, to minimize the probability of hash collisions (where different source strings result in the same value after hashing) the data reduction may be, for example, a hash to 64 bits.

The string S that is hashed may also include information about the destination port. The destination port generally remains the same for a worm, and may distinguish frequent email content from frequent Web content or peer-to-peer traffic in which the destination port changes.

In an embodiment, use of the Rabin hash function (also called the Rabin fingerprint) advantageously simplifies the analysis of data across packets. In an embodiment, the last 40 byte subsection of the data payload of a packet is stored after the packet processing is complete. The Rabin fingerprint for that subsection is also stored. When the next data payload is analyzed, the Rabin fingerprint is computed for the 40 byte subsection that includes the last 39 bytes of the previous packet and the first byte from the new packet. In this fashion, the packets may be examined and analyzed as a continuous stream of data—across packet boundaries. This allows the detection of an attack that spreads invariant strings across packets.

After a signature or key is created, the data manager 138 processes the signature. In an embodiment, the signature is subjected to a frequent signature test. Each key can be stored in a database. For example, the data manager 138 may maintain a content prevalence table and an address dispersion table (described later with respect to FIGS. 4 and 5, respectively). The content prevalence table includes entries for keys and the number of times the particular key has been encountered ("count"). If a newly generated key is not present in the address dispersion table, the key is placed in the content prevalence table for tracking of the number of times the key is encountered. When the count for a particular key in the content prevalence table exceeds a predetermined threshold, the data manager 138 moves the key into the address dispersion table. In an embodiment, the content prevalence and address dispersion tables may be periodically flushed or specific entries may individually expire after a predetermined time period.

FIG. 3 is a block diagram illustrating an example packet 200 according to an embodiment of the present invention. In the illustrated embodiment, the packet 200 comprises a header 210 and a data payload 220. The header 210 typically includes information relevant to the packet 200 such as the protocol by which the packet should be processed, the source IP address, the source IP port, the destination IP address, and the destination IP port. Other information may also be advantageously located in the header 210.

The data payload 220 can be very large and is preferably divided up into smaller more manageable sized chunks, for example by the aforementioned parser. These more manageable sized chunks are shown as payload subsections 230. The size of a payload subsection can vary and is preferably optimized based on the processing power of the sensor 20, available memory 22, and other performance or result oriented parameters. In one embodiment, the size of a payload subsection 230 is 40 bytes.

Alternatively, the data payload subsections can be all of the contiguous strings in the data payload of any length. Or the subsections may be all of the contiguous strings in the data payload with the same length. Other possible combinations of data payload subsections may also be employed as will be understood by those skilled in the art. In a preferred embodiment, each subsection is 40 bytes, with the first subsection comprising bytes 1-40; the second subsection comprising bytes 2-41; the third subsection comprising bytes 3-42; and so on until each byte in the data payload is included in at least one subsection.

FIG. 4 is a block diagram illustrating an example content prevalence table 250 according to an embodiment of the invention. In the illustrated embodiment, each row of the content prevalence table 250 includes a key and a count. For example, the count may represent the number of times the specific key has been encountered. As previously described, the key may be a string from the data payload of a packet and may also include the protocol and/or destination port information from the packet header. Alternatively, the key may be a representation of the string from the data payload (or the string combined with header information) after a data reduction has been performed.

In an embodiment, the data manager 138 (previously described with respect to FIG. 2C) may maintain the content prevalence table 250. For example, when an new key is identified, the key is looked up in the content prevalence table 250. If the key is not in the table, it is added to the table along with a count of 0. Alternatively, if the key is already in the table, then the count associated with the key is incremented.

Additionally, a frequency threshold can also be defined. Thus, if the count for a particular key exceeds the frequency threshold, then the key is identified as a frequent or repetitive key. In an alternative embodiment, a time threshold may also be defined for each entry in the content prevalence table 250. Accordingly, when the time threshold is reached for a particular entry, the counter can be reset so that the frequent content test effectively requires the key to be identified a certain number of times during a specified time period.

FIG. 5 is a block diagram illustrating an example address dispersion table 270 according to an embodiment of the invention. In the illustrated embodiment, each row of the address dispersion table 270 includes a key and a count of the unique source IP addresses and a count of the unique destination IP addresses associated with the key. When a particular key in the content prevalence table 250 is identified as being a frequent or repetitive key, the data manager preferably creates an entry in the address dispersion table 270 for that key. Alternatively, when the key manager identifies a key that already exists in the address dispersion table 270, the relative counts for the unique source IP address and the unique destination IP address is updated if necessary.

Because the tables illustrated in FIGS. 4 and 5 may become quite huge in practice, data reduction techniques may be performed to manage the content prevalence and the address dispersion tables. For example, a data reduction hash may be performed on one or both of the tables 250 and 270.

In an embodiment, an optional front end test such as a Bloom Filter (described in Burton Bloom: Space/Time Tradeoffs In Hash Coding With Allowable Errors; Communications ACM, 1970) or a counting Bloom Filter (described in Fan, et al., Summary Cache: A Scalable Wide-Area Web Cache Sharing Protocol, SIGCOMM 98, 1998) to sieve out content that is repeated only a small number of times.

FIG. 6 is a functional block diagram illustrating an example hashing technique according to an embodiment of the invention. In general, for a more scalable storage of content in the content prevalence and/or address dispersion tables, a certain number k of hash stages are established. Each stage I hashes the value S using a specified hash function Hash(I), where Hash(I) is a different hash function for each stage I. For each of those stages, a specific position, k(I) is obtained from the hashing. The counter in position k(I) is incremented in each of the k stages. Then, the next I is established. Again, there are k stages, where k is often at least three, but could even be 1 or 2 in some instances.

The data reduction hashing system checks to see if all of the k stage counters that are incremented by the hash for a specific string S are greater than a stage frequency threshold. S is added to the frequent content table only when all of the k counters are all greater than the threshold.

Specifically with respect to FIG. 6, when k=3, the data reduction technique would be called a 3 stage hash. Each stage is a table of counters which is indexed by the associated hash function (Hash(I)) that is computed based on the packet content. At the beginning of each measurement interval, all counters in each stage are initialized to 0. Each packet comes in (e.g., Packet S) and is hashed by a hash function associated with the stage. The result of the hash is used to set a counter in that stage.

For example, the packet S is hashed by a stage 1 hash function. This produces a result of 2, shown incrementing counter 2 in the stage 1 counter array. The same packet S is also hashed using the stage 2 hash function, which results in an increment to counter 0 in the stage 2 counter array. Similarly, the packet S is hashed by the stage 3 hash function, which increments counter 6 of the stage 3 counter array. In this example, the same packet hashes to three different sections (in general, though there is a small probability that these sections may coincide) in the three different counter stages.

After the hashing, the stage detector 290 determines if the counters that have currently been incremented are each above the frequency threshold. The signature is added to the frequent content memory 295 only when all of the stages have been incremented above the stage frequency threshold.

As examples, the stage 1 hash function could sum digits and take the remainder when divided by 13. The stage 2 hash function could sum digits and take the remainder when divided by 37 and the stage 3 hash function could be a third independent function. In an embodiment, parameterized hash functions may be used, with different parameters for the different stages, to produce different but independent instances of the hash function.

The use of multiple hash stages with independent hash functions reduces the problems caused by multiple hash collisions. Moreover, the system is entirely scalable. By simply adding another stage, the effect of hash collisions is geometrically reduced. Moreover, since the memory accesses can be performed in parallel, this can form a very efficient, multi-threaded software or hardware implementation.

Advantageously, the bits in the individual stage counter arrays can be weighted by the probability of hash collisions, in order to get a more accurate count. When counting source and destination IP address, the weighting provides a more accurate count of the number of unique sources and destinations. Additionally, when applied to counting IP addresses, this technique effectively creates and stores a bitmap, where each bit represents an IP address. Advantageously, the storage requirements are significantly reduced, rather than storing the entire 32-bit IP address in an address table.

While the bitmap solution is better than storing complete addresses, it still may require keeping hundreds of thousands of bits per frequent content. Another solution carries out even further data compression by using a threshold T which defines a large value. For example, defining T as 100, this system only detects values that are large in terms of source addresses. Therefore, no table entries are necessary until more than 100 source addresses are found.

It also may be desirable to know not only the number of source addresses, but also the rate of increase of the source addresses. For example, it may be desirable to know that even though a trigger after 100 sources is made, that in the next second there are 200 sources, in the second after that there are 400 sources, and the like.

In an embodiment, even more scaling is achievable to advantageously use only a small portion of the entire bit map space. For example, if an identified signature is a frequent signature the IP address is hashed to a W bit number $S_{HASH}$. Only certain bits of that hash are selected, e.g. the low order r bits. That is, this system scales down the count to only sampling a small portion of the bitmap space. However, the same scaling is used to estimate the complete bitmap space. The same scaling down operations are also carried out on the destination address.

For example, an array of 32-bits (i.e., r=32) may be maintained, where the threshold T is 96. Each source address of the content is hashed to a position between 1 and 96. If the position is between 1 and 32, then it is set. If the position is beyond 32, then it is ignored, since there is no portion in the array for that bit.

At the end of a time interval, the number of bits set into the 32-bit array is counted, and corrected for collisions. The value is scaled up based on the number of bits which were ignored. Thus, for any value of T, the number of bits set within the available portion of the registers is counted, and scaled by a factor of T. For example, in the previous example, if we had hashed from 1 to 96 but only stored 1 through 32, the final estimate would be scaled up by a factor of 3.

This technique may also be used to count a rising infection over several intervals, by changing the scaling factor. For example, a different scaling factor is stored along with the array in each interval. This technique can, therefore, reliably count from a very small to a very large number of source addresses with only a very small number of bits, and can also track rising infection levels.

Accordingly, the address is hashed and a scale factor for source addresses is assigned to a variable, e.g., SourceScale. If the high order bits of the hash from positions r+1 to r+SourceScale are all zero, the low order r bits are used to set the corresponding position in the source bit map. For example, if SourceScale is initially 3 and r is 32, essentially all but the low order 35 bits of the hash are ignored and the low order 32 bits of the 35 bits are focused on, a scaling of $2^{(35-32)}=2^3=8$.

When the time interval ends, the counter is cleared, and the variable (SourceScale) is incremented by some amount. If, in the next interval the scale factor goes up to 4, the scaling focuses on the top 36 bits of the hash, giving a scaling of $2^4=16$. Thus by incrementing the variable (SourceScale) by 1, the amount of source addresses that can be counted is doubled. Thus when comparing against the threshold for source addresses, the number of bits in the hash is scaled by a factor of $2^{(SourceScale-1)}$ before being compared to the threshold. This same technique can also be used for destination IP addresses.

Figure 7:
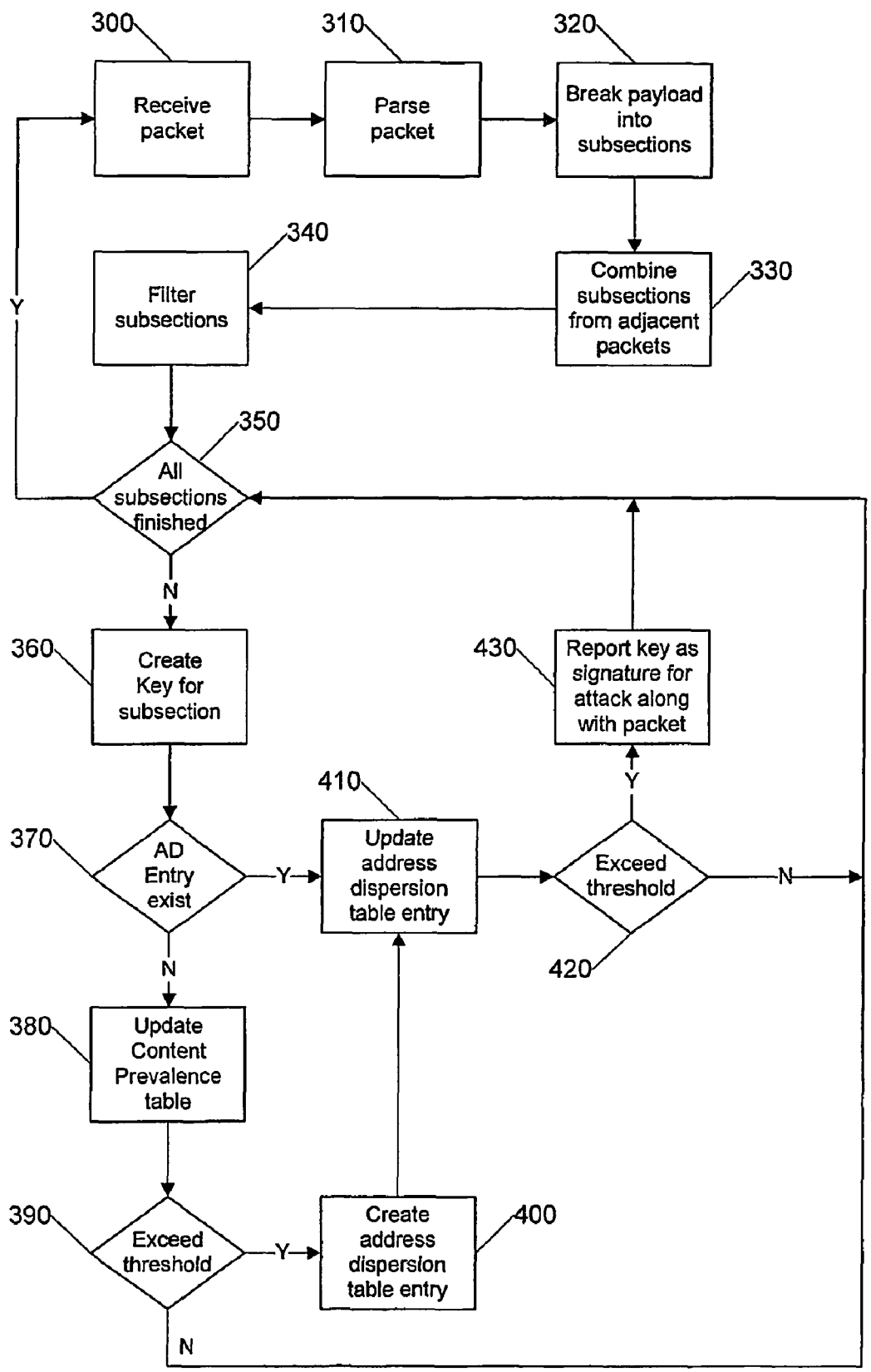
FIG. 7 is a flow diagram illustrating an example process for identifying a worm signature according to an embodiment of the invention.

FIG. 7 is a flow diagram illustrating an example process for identifying a worm signature according to an embodiment of the invention. At a high level, a network attack can be detected by receiving a plurality of packets on a network and analyzing the data payloads of those packets to detect common content among the packets. Data reduction techniques may also be employed to optimize the high level process. For example, initially, in step 300, the sensor receives a packet. For example, the previously described communication module may receive the packet. Upon receipt, the packet is parsed in step 310 and header information is extracted and the data payload is divided up into a plurality of strings (subsections) as shown in step 320. In an embodiment, the parsing function may be carried out by the previously described parser module. In a brute force method, the data payload may be divided up into the universe of all possible strings of one or more characters that are present in the data payload. Such an operation, however, is computationally expensive.

Alternatively, the data payload may be divided up into the universe of all strings having a minimum length. While this further reduces the number of strings relative to the minimum length, the operation remains computationally expensive.

In an embodiment, the data payload may be divided up into the universe of all strings of a specific length. This operation significantly reduces the number of strings created by the parsing of the data payload without compromise because each string created is representative of all longer strings including the baseline string. Advantageously, the specific string length can be optimized for detecting invariant strings in viruses and worms.

Additionally, if a specific length subsection is employed, then a portion of the data from the previous packet and a portion of the data from the current packet can be combined to create specific length subsections that span the packet boundary, as illustrated in step 330. For example, if the specific length was 40 bytes, then the last 39 bytes of the data payload of the previous packet and the first byte from the data payload of the current packet can be combined to create a single subsection.

Once the data payload has been parsed into subsections, and combined with portions from an adjacent packet, the subsections are then filtered, as shown in step 340. In one embodiment, the filtering function may be carried out by the previously described filter module. The filtering may be carried out in a series of multi-stage hardware components or it may be carried out in software. The function of the filtering is to reduce the number of data payload subsections that require processing. In an embodiment, the Rabin fingerprint is calculated for each subsection and then only those subsections meeting a predetermined criteria are processed further. For example, after the Rabin fingerprint is calculated, each subsection that ends with six (6) zeroes is processed further. This may have the effect of thinning the number of subsections requiring processing to a fraction of the original number, for example to $1/64^{th}$ of the original number. Furthermore, because Rabin fingerprinting is randomly distributed, the creator of a worm or virus cannot know which subsections will be selected for further processing.

In one example, if the specific string length is 40 bytes and the thinning ratio is 1/64, the probability of tracking a worm with a signature of 100 bytes is 55%. However, the probability of tracking a worm with a signature of 200 bytes is 92% and the probability of tracking a worm with a signature of 400 bytes is 99.64%. Notably, all known worms today have had invariant content (i.e., a signature) of at least 400 bytes.

After the data payload subsections have been filtered, processing step 350 can be undertaken to determine if all of the subsections have been processed. If they have, then the process loops back to receive the next packet in step 330. If all of the subsections have not been processed, then in step 360 a key is created for each data subsection. In one embodiment, the key creation may be carried out by the previously described key module. The key preferably includes the protocol identifier, the destination port, and the Rabin fingerprint for the data subsection. Alternatively, the key can include the Rabin fingerprint alone, or the Rabin fingerprint and the protocol, or the Rabin fingerprint and any combination of other identifying information. Once the key is created, the address dispersion table is consulted in step 370 to see if the key exists in the table. If the key does not exist in the address dispersion table, then the content prevalence table is updated in step 380 accordingly and the count for the key is initialized if the entry is new or incremented if the key was already present in the content prevalence table. If the count is incremented and the new count exceeds the predetermined threshold number as determined in step 390, then an entry for the key is created in the address dispersion table as illustrated in step 400. If the count does not exceed the threshold (or after the address dispersion table entry is created), the process returns to step 350 to determine if all subsections have been processed.

After an entry is created in the address dispersion table in step 400, then the entry is updated to fill in the necessary information. Additionally, back in step 340, if it is determined that an address dispersion table entry exists for the particular key, then the entry is updated. For example, the count for the source IP address and the count for the destination IP address can be updated in step 410 if those addresses are unique and have not yet been associated with the particular key.

After the address counts are updated, it is determined in step 420 if the new counts exceed a predetermined threshold. If they do, then in step 430 the key is reported (e.g., to the aggregator) as a possible signature for a suspected worm. Additionally, the packet (or packets if the data for the key came from two adjacent packets) containing the key are also reported. If the counts do not exceed the threshold (or after the report has been made), then the process returns to the step 350 to determine if all subsections have been processed.

Those of skill will further appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit without departing from the invention.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or technique described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles defined herein can be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A system, comprising at least one hardware module, for detecting a network attack, comprising:
   a communication module configured to receive a plurality of packets on a network; and
   a signature module configured to receive said plurality of packets from the communication module and analyze the content of said packets to detect common content among said packets to identify a network attack; and
   a content analysis module configured to analyze the common content of said plurality of packets, including criteria not based on a known vulnerability, to identify a network attack;
   wherein the content analysis module comprises a correlation module configured to determine whether packets sent in a first interval to a destination address are sent from said destination address in a second interval.

2. The system of claim 1, wherein the signature module further comprises:
   a parser module configured to parse packets into a plurality of portions;
   a key module configured to perform a data reduction on each of said plurality of portions to create a plurality of data reduced portions;
   and a data module configured to store said data reduced portions in a data storage area, wherein the reduced data portions in the plurality of data reduced portions have a smaller size and a constant predetermined relation with portions into which the packets are parsed and at least some of the portions into which the packets are parsed that differ are reduced to the same reduced data portion.

3. The system of claim 2, further comprising a filter module configured to reduce the number of said plurality of data reduced portions prior to storage.

4. The system of claim 1, wherein the content analysis module further comprises a code detection module configured to identify the presence of executable code in a packet.

5. A computer implemented method for analyzing network activity, comprising:
  receiving, at a computer, a plurality of packets transiting a network;
  analyzing, at the computer, the content of said plurality of packets to detect common content among said packets;
  identifying, at the computer, network attacks based upon said analysis for common content, wherein criteria for the analysis of the common content of said plurality of packets includes criteria not based on a known vulnerability; and
  comparing the destinations of said plurality of packets with destinations having known vulnerabilities.

6. The method of claim 5 wherein analyzing the content further comprises performing a data reduction on at least a portion of each of the packets of said plurality of packets to form a plurality of data reduced packets, wherein the reduced data packets in the plurality of data reduced packets have a smaller size and a constant predetermined relation with the packets transiting the network and at least some of the packets transiting the network that differ are reduced to the same reduced data packet.

7. The method of claim 6 wherein said data reduction comprises performing a hash function on at least a portion of each of the packets.

8. The method of claim 7 wherein said hash function is an incremental hash function.

9. The method of claim 6, wherein analyzing further comprises analyzing a subset of the data reduced portions, the subset identified by a common characteristic of each of the data reduced portions.

10. The method of claim 6, wherein analyzing further comprises analyzing a subset of the data reduced portions, the subset identified by a common characteristic of each of the data reduced portions.

11. The method of claim 10, wherein the common characteristic is the reduced data portion being equal to a value in a set of predefined values.

12. The method of claim 5 wherein identifying further comprises identifying one or more signatures of an attack.

13. The method of claim 5, wherein analyzing the content includes analyzing the content of the payloads in the plurality of packets.

14. The method of claim 5 further comprising determining whether there is an increasing number of sources and destinations of packets having common content.

15. The method of claim 5 further comprising analyzing the content of said plurality of packets for the presence of a specified type of code.

16. The method of claim 5 further comprising forming a plurality of portions from each of said plurality of packets, each portion comprising a specified subset of a packet.

17. A computer implemented method for analyzing network activity comprising:
  obtaining a plurality of packets being transmitted across a network;
  performing a data reduction on at least a portion of each of the packets of said plurality of packets to form a plurality of data reduced packets, wherein the reduced data packets in the plurality of data reduced packets have a smaller size and a constant predetermined relation with the packets being transmitted across the network and at least some of the packets being transmitted across the network that differ are reduced to the same reduced data packet;
  detecting repetition of content among said plurality of data packets based on the reduced data packets;
  comparing destinations of said plurality of packets with destinations having known vulnerabilities; and
  identifying network attacks based upon said detection of repetition and said comparison of destinations.

18. The method of claim 17 wherein the destinations of said plurality of packets are only analyzed for packets wherein a repetition of content has been detected.

19. The method of claim 17, further comprising analyzing the content of the payloads in the plurality of packets.

20. The method of claim 19 further comprising analyzing the content of said plurality of packets for the presence of a specified type of code.

21. The method of claim 20 further comprising:
  maintaining a first list of addresses;
  forming a second list of sources that have sent to addresses on said first list; and
  comparing a current source of common content to said second list.

22. The method of claim 17 wherein said data reduction comprises carrying out a hash function on at least a portion of each of the packets.

23. The method of claim 17 wherein said detecting common content comprises using at least first, second and third data reduction techniques on at least a portion of each of the packets, to obtain at least first, second and third results, and to count said first, second and third results, and to detect repetition when all of said at least first second and third results have a frequency of occurrence greater than a specified amount.

24. The method of claim 17 further comprising:
  monitoring a first content sent to a destination;
  monitoring a second content sent by said destination; and
  determining whether there is a correlation between said first content and said second content.

25. The method of claim 17 further comprising forming a plurality of portions from each of said plurality of packets, each portion comprising a specified subset of a packet.

26. The method of claim 25, wherein:
  forming a plurality of portions further comprises
    identifying all portions comprising a specified subset of a packet, and
    forming a plurality of portions from a subset of said all portions;
  each portion in the subset has a common characteristic.

27. The method of claim 26, wherein the specified subset is a segment of data from the data payload having a predetermined byte size.

28. The method of claim 25, wherein:
  a first portion of the plurality is from two or more adjacent packets; and
  the first portion is obtained by storing a minimum length subsection comprising data from the two or more adjacent packets.

29. A method of analyzing network activity comprising:
obtaining, at a computer, a plurality of packets transiting a network;
performing, at a computer, a data reduction on at least a portion of each of the packets of said plurality of packets to form a plurality of data reduced packets, wherein the reduced data packets in the plurality of data reduced packets have a smaller size and a constant predetermined relation with the packets transiting the network and at least some of the packets transiting the network that differ are reduced to the same reduced data packet;
analyzing, at a computer, said plurality of data reduced packets to detect a repetition of at least a portion of content among said plurality of data packets based on criteria not necessarily based on a known vulnerability;
comparing the destinations of said plurality of packets with destinations having known vulnerabilities; and
analyzing, at a computer, said packets having repetitive content to determine if said packets are spreading.

30. The method of claim 29, wherein analyzing for spreading comprises determining whether there is an increasing number of sources and destinations of packets having common content.

31. The method of claim 29 wherein analyzing spreading comprises:
monitoring a first content sent to a destination;
monitoring a second content sent by said destination; and
determining a whether there is a correlation between said first content and said second content.

32. The method of claim 31 further comprising analyzing the content of said plurality of packets for the presence of a specified type of code.

33. The method of claim 29 further comprising determining a signature of an attack based upon said analyzing of said plurality of data reduced packets and said analyzing spreading.

34. The method of claim 29, wherein analyzing of said plurality of data reduced packets includes analyzing the content of the payloads in the plurality of packets.

35. The method of claim 29 wherein said data reduction comprises carrying out a hash function on at least a portion of each of the packets.

36. The method of claim 29 further comprising using at least first, second and third data reduction techniques on at least a portion of each of the packets, to obtain at least first, second and third results, and to count said first, second and third results, and to establish frequently occurring sections when all of said at least first second and third results have a frequency of occurrence greater than a specified amount.

37. The method of claim 29 further comprising forming a plurality of portions from each of said plurality of packets, each portion comprising a specified subset of a packet.

38. The method of claim 37, wherein a first portion of the plurality is from at least two packets.

39. The method of claim 37, wherein analyzing further comprises analyzing a subset of the plurality of portions, the subset identified by a common characteristic of each of said portions.

40. The method of claim 39, wherein the specified subset is a segment of data from the data payload having a predetermined byte size.

41. An apparatus comprising:
a signature generator, having a connection to a network, to obtain a portion of data from the network, operating to carry out a data reduction on said data portion by carrying out a hash function to reduce said data portion to a reduced data portion in a repeatable manner;
a memory, storing said reduced data portions,
wherein said signature generator also operates to detect common elements within said reduced data portion, and
a content analysis module configured to analyze the common elements using criteria not based on a known vulnerability, to identify a network attack;
wherein the content analysis module comprises a correlation module configured to determine whether packets sent in a first interval to a destination address are sent from said destination address in a second interval.

42. An apparatus as in claim 41, wherein said signature generator determining frequently occurring sections of message information within said reduced data portion.

43. An apparatus as in claim 42, further comprising a module that carries out an additional test on said frequently occurring sections of message information after said signature generator determines frequently occurring sections of message information.

44. An apparatus as in claim 43, wherein said additional test is a test to look for an increasing number of at least one of sources and destinations of said frequently occurring sections of message information.

45. An apparatus as in claim 44, wherein said module is a module to look for code within the frequently occurring sections.

46. An apparatus as in claim 43, wherein said module:
maintains a first list of unassigned addresses in said memory;
forms a second list of sources that have sent to addresses on said first list; and
compares a current source of a frequently occurring section to said second list.

47. An apparatus as in claim 46, wherein said module data reduces information prior to storing in said list.

48. An apparatus as in claim 47, wherein said portion of a network header is a port number indicating a service requested by a network packet.

49. An apparatus as in claim 46, wherein said module operates to:
first monitor a first content sent to a destination;
second monitor a second content sent by said destination; and
determine a correlation between said first content and said second content as said additional test.

50. An apparatus as in claim 49, wherein:
said first monitoring comprises monitoring multiple destinations; and
said second monitoring comprises monitoring multiple destinations during a different time period than said first monitoring.

51. An apparatus as in claim 46 wherein said portion of data further includes a portion of a network header.

52. An apparatus as in claim 46, wherein said portion of data comprises a first subset of a network packet including payload and header and wherein said data portion module further obtains a second subset of the same network packet for subsequent analysis.

53. An apparatus as in claim 52, wherein said data portion module forms a plurality of portions from each network packet, each of said plurality of portions comprising a specified subset of the network packet.

54. An apparatus as in claim 46, wherein said signature generator operates to form a hash function of at least one of the source or destination address, to form hash values using the hash function, to first determine a unique number of said hash values, and to second determine a number of said one of source or destination addresses based on said unique number from said first determine.

55. An apparatus as in claim 54, wherein said count carried out by said signature generator further comprises scaling the hash values prior to said second determine.

56. A apparatus as in claim 55, wherein said scaling comprises scaling by a first value during a first counting session, and scaling by a second value during a second measurement interval.

57. An apparatus as in claim 42, wherein said determining frequently occurring sections is done by using at least first, second and third data reduction techniques on each said portion, to obtain first, second and third results, and to count said first, second and third results, and to establish frequently occurring sections when all of said first second and third results have a frequency of occurrence greater than a specified amount.

58. An apparatus as in claim 41, wherein said memory stores information indicative of at least one of a number of sources sending the common content, and/or destinations that are receiving the common content, and said signature generator determines whether said number is increasing.

59. An apparatus as in claim 41, wherein said signature generator also analyzes for the presence of a specified type of code within said data portion.

60. An apparatus as in claim 41, further comprising forming a plurality of portions from each network packet, each of said plurality of portions comprising a continuous portion of payload, and information indicative of a port number requested by a network packet.

61. An apparatus as in claim 41, further comprising:
   first and second hash generators, respectively forming first and second hash functions of said portions;
   a first counter, with a plurality of stages, connected such that respective stages of said counter are incremented based on said first hash function;
   a second counter, with a plurality of stages, and connected such that respective stages of said counter are incremented based on said first hash function.

62. An apparatus as in claim 61, further comprising a module that checks said one of said stages of said first counter and said one of said stages of said second counter against a threshold, and identifies said portion as frequent content only when both said one of said stages of said first counter and said one of said stages of said second counter are both above said threshold.

63. An apparatus as in claim 62, further comprising a frequent content buffer table storing specified frequent content.

64. An apparatus as in claim 63, further comprising at least a third counter, and a third hash generator, taking a third hash of said portion, and incrementing a stage of said third counter based on said third hash, where said module identifies said portion as frequent content only when all of said stages of each of said first, second and third counters are each above said threshold.

65. An apparatus as in claim 64, wherein said signature generator includes a sliding window portion that first obtains said portion by taking a first part of the message, and subsequently obtains said portion by taking a second part of the message.

66. A apparatus as in claim 65, wherein at least one of said hash functions is an incremental hash function.

67. An apparatus as in claim 41, wherein said memory stores a list of computers on the network, and stores an update level for each of said computers indicating which of said computers is susceptible to a specified kind of attack, and a module which monitors for said kind of attack only when the message is directed for a computer which is susceptible to said kind of attack.

68. An apparatus of claim 67 where said module checks comprises checking for a message that attempts to exploit a known vulnerability to which a computer is vulnerable, as said specified attack.

69. An apparatus as in claim 68, wherein said module checks for a field that is longer than a specified length.

* * * * *